(12) United States Patent
Burris et al.

(10) Patent No.: US 8,914,388 B2
(45) Date of Patent: Dec. 16, 2014

(54) CENTRALIZED URL COMMENTING SERVICE ENABLING METADATA AGGREGATION

(75) Inventors: Thomas J. Burris, Pune (IN); Brian D. Goodman, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 13/030,937

(22) Filed: Feb. 18, 2011

(65) Prior Publication Data
US 2012/0215798 A1  Aug. 23, 2012

(51) Int. Cl.
G06F 17/30  (2006.01)

(52) U.S. Cl.
CPC .... G06F 17/30864 (2013.01); *G06F 17/30876* (2013.01)
USPC .......................................................... 707/755

(58) Field of Classification Search
CPC ................... G06F 17/30864; G06F 17/30876
USPC .......................................................... 707/755
See application file for complete search history.

(56) References Cited

U.S. PATENT DOCUMENTS

| | | | |
|---|---|---|---|
| 7,657,507 B2 | 2/2010 | Shi et al. | |
| 8,620,849 B2 * | 12/2013 | Moitra et al. | 706/50 |
| 2004/0205065 A1 * | 10/2004 | Petras et al. | 707/5 |
| 2008/0162157 A1 | 7/2008 | Daniluk | |
| 2008/0250327 A1 * | 10/2008 | Li et al. | 715/745 |
| 2009/0043814 A1 | 2/2009 | Faris et al. | |
| 2009/0164266 A1 | 6/2009 | Lakhani et al. | |
| 2009/0812804 | 6/2009 | Arbusto et al. | |
| 2009/0265307 A1 | 10/2009 | Reisman et al. | |
| 2012/0259859 A1 * | 10/2012 | Ishigami | 707/740 |
| 2012/0265806 A1 * | 10/2012 | Blanchflower et al. | 709/204 |

FOREIGN PATENT DOCUMENTS

WO   WO2009149063 A1   12/2009

OTHER PUBLICATIONS

Raghu Ramakrishnan & Andrew Tomkins, "Toward a PeopleWeb", IEEE Computer, vol. 40, issue 8, Aug. 2007, pp. 63-72.*
Jane Hunter & Ronald Schroeter, "Co-Annotea: A System for Tagging Relationships Between Multiple Mixed-Media Objects", IEEE MultiMedia, vol. 15, issue 3, Jul.-Sep. 2008, pp. 42-53.*
Anne Schuth et al., "Extracting the Discussion Structure in Comments on News-Articles", Nov. 9, 2007, ACM WIDM, pp. 97-104.*

* cited by examiner

*Primary Examiner* — Rehana Perveen
*Assistant Examiner* — Scott A Waldron
(74) *Attorney, Agent, or Firm* — Cahn & Samuels, LLP (57) ABSTRACT

An embodiment of the invention includes a method for centralized URL commenting, wherein user-generated comment data is extracted from web pages on a plurality of web sites. Access control parameters are also obtained from the web sites. The comment data is tagged with identifiers indicating the web sites that the comment data was extracted from, URLs indicating the web pages that the comment data are on, and authors of the comment data. The comment data is stored in a repository. Keywords are extracted from the comment data; and, the keywords are normalized. The normalizing of the keywords includes creating a single normalized keyword for multiple keywords related to the same topic, and tagging comment data that include at least one of the multiple keywords with the normalized keyword. Read access and/or write access to the repository is controlled based on the access control parameters.

25 Claims, 4 Drawing Sheets

FIG. 4

US 8,914,388 B2

CENTRALIZED URL COMMENTING SERVICE ENABLING METADATA AGGREGATION

BACKGROUND

The present invention is in the field of methods, systems, and computer program products for a centralized universal resource locator (URL) commenting service enabling metadata aggregation.

Many web sites and web-based applications allow for user commenting, which permits visitors or registered members of the web sites or users of the web applications to associate self-authored free-text with other data. For example, solutions such as Disqus (DISQUS.COM) offer web sites the ability to surface a commenting widget. The commenting widget enables users the ability to comment on the web pages of the web sites.

Commenting is a social activity, meaning more than one user has access to comment on a web page, and there are no (or relatively minor) restrictions on what constitutes a "comment"—a comment is just free text. Thus, users often use variants of the same words in their comments. This is especially true in a system where disparate web sites with varying user populations with varying domains of knowledge and vocabulary feed into a central comment database.

SUMMARY OF THE INVENTION

An embodiment of the invention includes a method for centralized URL commenting, wherein user-generated comment data is extracted from web pages on a plurality of web sites. Access control parameters are also obtained from the web sites. The comment data is tagged with identifiers indicating the web sites that the comment data was extracted from, URLs indicating the web pages that the comment data are on, and authors of the comment data. The comment data is stored in a repository. Keywords are extracted from the comment data; and, the keywords are normalized. The normalizing of the keywords includes creating a single normalized keyword for multiple keywords related to the same topic, and tagging comment data that include at least one of the multiple keywords with the normalized keyword. Read access and/or write access to the repository is controlled based on the access control parameters.

Another embodiment of the invention provides a system for centralized URL commenting, wherein the system includes an aggregation module for extracting user-generated comment data from web pages of a plurality of web sites. A registration module obtains access control parameters from the web sites; and, a processor tags the comment data. The comment data is tagged with identifiers indicating the web sites that the comment data was extracted from, URLs indicating the web pages that the comment data are on, and authors of the comment data. The system further includes a repository for storing the comment data. A text analyzer extracts keywords from the comment data and normalizes the keywords to create a single normalized keyword for multiple keywords related to the same topic. The processor tags comment data that include at least one of the multiple keywords with the normalized keyword. An access controller is provided for controlling read access and/or write access to the repository based on the access control parameters.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a common service for aggregating commenting data and providing federated services across large numbers of web spaces. Furthermore, embodiments herein provide text indexing (extracting searchable keywords from user-authored free text) and normalization services across the extracted keyword data. For example, the word MOUSE in a comment on one site's web page is related to the word MICE in a comment on another site's web page. The commenting data aggregated from multiple sites is then exposed via a variety of services and widgets enabling the benefits of data federation—i.e., the collection of commenting data from multiple sources or social web spaces into a single physical or logical repository.

At least one embodiment of the invention provides a service that enables web applications to collect and display user-authored comment data on their sites with access control using services or widgets (application services). The service enables aggregation of commenting data and normalizes keywords extracted from the user-authored comments to support federated services across all sites and comments. More specifically, a centralized service provides a browser-based interface for users of a web site to enter comments associated with URLs. The client is loaded from the service and rendered via the browser so that it appears on the third party web site. Users' comments are stored by the service in such a way that allows each web application or web site to have a distinct collection of comments with configurable access control applied to each.

For example, in one embodiment, a web site enables comment-based search across only web pages from its own sites. In another embodiment, the web site enables comment-based search across web pages from one or more other sites. Keywords extracted from comments (e.g., via known methods of unstructured text analysis) are normalized across all collections, i.e., the keywords are transformed as necessary utilizing other keywords extracted from all comments across all sites such that keyword variants are associated with a single, normalized form of the keyword.

The centralized service further offers data and/or graphical user interface (GUI) services for accessing and interacting with the data. For instance, in one embodiment, a browser-based interface is provided for web applications and web sites to surface (i.e., retrieve) the commenting data that has been entered on their and others' sites in various forms, such as, for example, keyword "clouds" to highlight often-used words and concepts. A mechanism for searching the central commenting repository is also provided, subject to the configured application-specific access control. The searches utilize the normalized form of keywords to find URL matches for keyword variants across comment collections from all sites.

Figure 1:
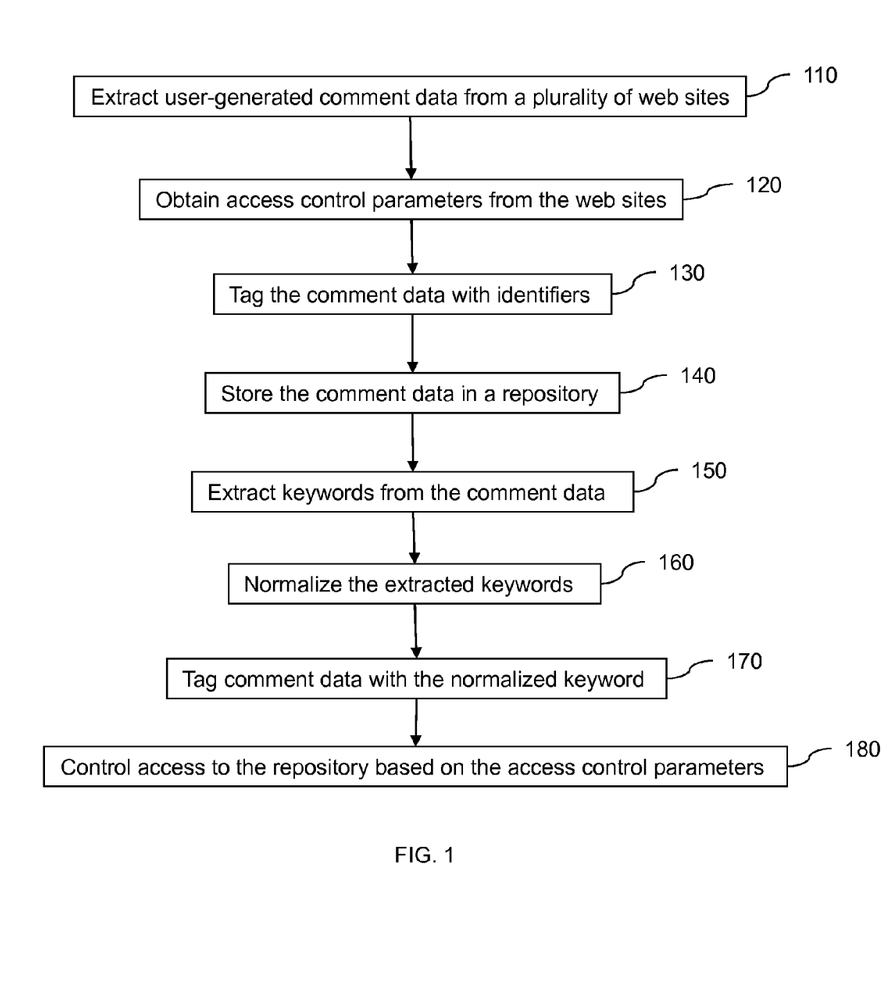
FIG. 1 is a flow diagram illustrating a method for centralized URL commenting according to an embodiment of the invention.

FIG. 1 is a flow diagram illustrating a method for centralized URL commenting according to an embodiment of the invention. User-generated comment data is extracted from a plurality of web sites 110, wherein the comment data is generated by users (e.g., visitors or registered members) of web pages of the web sites. For example, comments generated by registered members of WORLDNEWS.COM and XYZNEWS.COM are extracted from web pages on the respective web sites that are directed towards entertainment news stories.

In one embodiment, the comment data is extracted from widgets on the web pages, wherein the widgets are commonly used among all of the web pages, i.e., a uniform commenting widget that is standard among all of the web sites. In another embodiment, the comment data is extracted from a user interface on the web page, wherein the user interface is not commonly used among all of the web pages, i.e., a specialized user interface that is not standard among all of the web sites (e.g., a customized commenting interface that is unique to XYZNEWS.COM).

In at least one embodiment of the invention, the widgets are uploaded onto the web pages for entering and/or viewing the comment data. In another embodiment, the widgets surface results of analysis of the comment data, e.g., query results for related content or related people.

Figure 2:
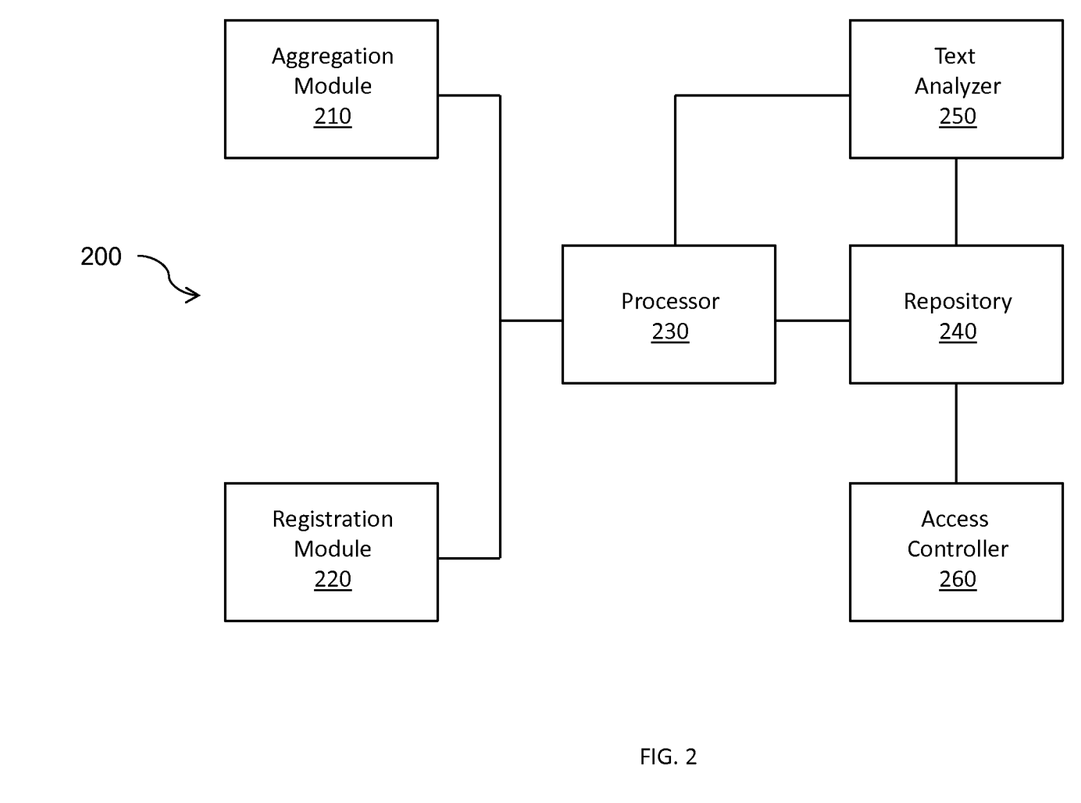
FIG. 2 illustrates a system for centralized URL commenting according to an embodiment of the invention.

Access control parameters are also obtained from the web sites 120. In at least one embodiment, the access control parameters are obtained via a registration process, wherein the web sites register with the ECS system. FIG. 2 illustrates an ECS system 200 for centralized URL commenting according to an embodiment of the invention. The system 200 includes an aggregation module 210 for extracting the comment data and a registration module 220 for obtaining the access control parameters. As described more fully below, the access control parameters control read and write access to the comment data. For example, a user A has authorization to read comments on web applications X, Y, and Z, but only has authorization to write comments on web application X.

The system further includes a processor 230 for tagging the comment data with identifiers that indicate the web sites that the comment data was extracted from 130. In one embodiment, the identifiers include a one or two word description of the web sites, e.g., sports, travel, news, weather, shopping, personals, social networking. In at least one embodiment, the comment data is also tagged with the URLs that indicate the web pages that the comment data are on (e.g., SPORTSNEWS.COM or SPORTSNEWS.COM/FOOTBALLNEWS/CHICAGO/JOHNSMITH.20100701) and/or the authors of the comment data (e.g., the registered user that commented on the news story). The comment data is stored in a repository 240, 140.

A text analyzer 250 extracts keywords from the comment data 150. For example, the keywords DIGITAL, CAMERA, VIDEO, MEGAPIXEL, ZOOM, BATTERY, MEMORY, and USB are extracted from an ELECTRONICS.COM web page directed towards a digital camera. In at least one embodiment, the keywords are generated by the web sites and/or the system 200.

The text analyzer 250 also normalizes the extracted keywords by creating a single normalized keyword for multiple keywords related to the same topic 160. For example, the text analyzer 250 creates the normalized keyword PHOTO for the keywords PHOTO, PHOTOS, PHOTOGRAPH, PHOTOGRAPHS, PHOTOGRAPHIC, PHOTOGRAPHY, PICTURE, and PICTURES. Comment data that includes at least one of the multiple keywords is tagged with the normalized keyword 170. Thus, in the above example, comment data in the repository 240 that includes one or more of the keywords PHOTO, PHOTOS, PHOTOGRAPH, PHOTOGRAPHS, PHOTOGRAPHIC, PHOTOGRAPHY, PICTURE, or PICTURES, is tagged with the normalized keyword PHOTO. In at least one embodiment, the comment data is not stored in the repository 240 until after the comment data is tagged with the normalized keyword.

At least one embodiment of the invention replaces a normalized keyword with an updated normalized keyword. The normalized keyword is updated based on comment data in the repository 240 at the time the normalized keyword was created, new comment data extracted from the web sites since the normalized keyword was created, and/or search terms used to query the repository 240. For example, the normalized keyword PHOTO is replaced with the updated normalized keyword IMAGE based on comment data in the repository 240 that includes the keywords IMAGE and/or IMAGES at the time the normalized keyword PHOTO was created, new comment data extracted from the web sites including the keywords IMAGE and/or IMAGES since the normalized keyword PHOTO was created, and/or queries of the repository 240 including the search terms IMAGE and/or IMAGES.

In at least one embodiment, the comment data tagged with the normalized keyword is further tagged with the updated normalized keyword, or the normalized keyword is replaced with the updated normalized keyword. In another embodiment of the invention, the normalized keyword remains the same, but now includes the new keywords related to the same topic that were discovered during the updating. Thus, in the example above, the normalized keyword PHOTO remains PHOTO after the updating, but is updated to include the keywords IMAGE and IMAGES. In other words, comment data including the keywords IMAGE and/or IMAGES are tagged with the normalized keyword PHOTO.

In another example, comment data including the keywords CAT, KITTEN, KITTY, PET, or ANIMAL is tagged with the normalized keyword CAT 170. After an update is performed based on comment data in the repository 240 at the time the normalized keyword CAT was created, new comment data extracted from the web sites since the normalized keyword CAT was created, and/or search terms used to query the repository 240, comment data including the keyword FELINE is tagged with the normalized keyword CAT.

In at least one embodiment, the comment data is not tagged with a normalized keyword; rather, the repository 240 is queried for a keyword and the multiple keywords related to the same topic. Thus, in the above example, when a user queries the repository 240 for the keyword PHOTOGRAPH, the repository 240 is also automatically queried for PHOTO, PHOTOS, PHOTOGRAPHS, PHOTOGRAPHIC, PHOTOGRAPHY, PICTURE, and PICTURES.

An access controller 260 controls access to the repository 240 based on the access control parameters 180. Access to the repository 240 includes read access and/or write access. In at least one embodiment, access to the repository 240 is via a graphical user interface, wherein the graphical user interface and/or the repository 240 are separate from the web sites.

In at least one embodiment, read access includes querying the repository 240. More specifically, a search engine 270 that includes hardware (e.g., processor, user interface) and/or software components queries the repository 240 using search terms input by a user. Thus, in one embodiment, a repository query including a URL is received, wherein results of the query include comment data tagged with the URL, authors of the comment data tagged with the URL, an identifier tagged to the comment data tagged with the URL, normalized keywords tagged to the comment data tagged with the URL, keywords extracted from the comment data tagged with the URL, and/or other data including results of analysis of the comment data (e.g., representations of sentiment associated with the URL). For example, query results for MOVIEREVIEWS.COM include comments posted by visitors of MOVIEREVIEWS.COM, the authors of the comment data, the identifier MOVIE REVIEWS, the normalized keyword MOVIE, and the keywords MOVIE, MOVIES, THEATER, CINEMA, FILM, and MOTION PICTURE.

In another embodiment, a repository query including an author (e.g., name, user name/ID, handle, and/or e-mail address) is received, wherein the query results include comment data tagged with the author, URLs tagged to the comment data tagged with the author, identifiers tagged to the comment data tagged with the author, normalized keywords tagged to the comment data tagged with the author, keywords extracted from the comment data tagged with the author, and/or other data including results of analysis of the comment data (e.g., representations of sentiment associated with the author). For example, query results for BOB SMITH or BOBSMITH include comments posted by BOB SMITH, the URLs where the comments are posted (e.g., MOVIEREVIEWS.COM, CINEMA2010.COM), the identifier MOVIE REVIEWS, the normalized keyword MOVIE, and the keywords MOVIE, MOVIES, THEATER, CINEMA, FILM, and MOTION PICTURE.

In another embodiment, a repository query including a normalized keyword is received, wherein the query results include comment data tagged with the normalized keyword, authors of the comment data tagged with the normalized keyword, URLs tagged to the comment data tagged with the normalized keyword, identifiers tagged to the comment data tagged with the normalized keyword, and/or keywords extracted from the comment data tagged with the normalized keyword. For example, query results for the normalized keyword TRAVEL include comments tagged with the normalized keyword TRAVEL (e.g., comments regarding cruise line XYZ), the authors of the comments, URLs of the web pages having the comments (e.g., TRAVEL.COM, AIRFARE.COM, AIRFARE.COM/MIAMI, AIRFACE.COM/MIAMI/20100701), the identifier TRAVEL, and the keywords TRAVEL, VACATION, FLIGHTS, AIRFARE, CRUISES, RENTALS, CAR RENTALS, HOTELS, MOTELS, and LODGING.

In another embodiment, a repository query including an identifier is received, wherein the query results include comment data tagged with the identifier, authors of the comment data tagged with the identifier, URLs tagged to the comment data tagged with the identifier, normalized keywords tagged to the comment data tagged with the identifier, keywords extracted from the comment data tagged with the identifier, and/or other data including results of analysis of the comment data (e.g., representations of sentiment associated with the identifier). For example, query results for the identifier JOBS include comment data tagged with the identifier JOBS (e.g., comments regarding employer XYZ, comments regarding software engineering jobs in Palo Alto, Calif.), authors of the comment data, URLs where the comment data is posted (e.g., JOBS.COM), the normalized keyword JOBS, and the keywords JOBS, CAREER, EMPLOYMENT, EMPLOYER, EMPLOYEE, EMPLOY, CLASSIFIEDS, OCCUPATION, PROFESSION, TRADE, and VOCATION.

Figure 3:
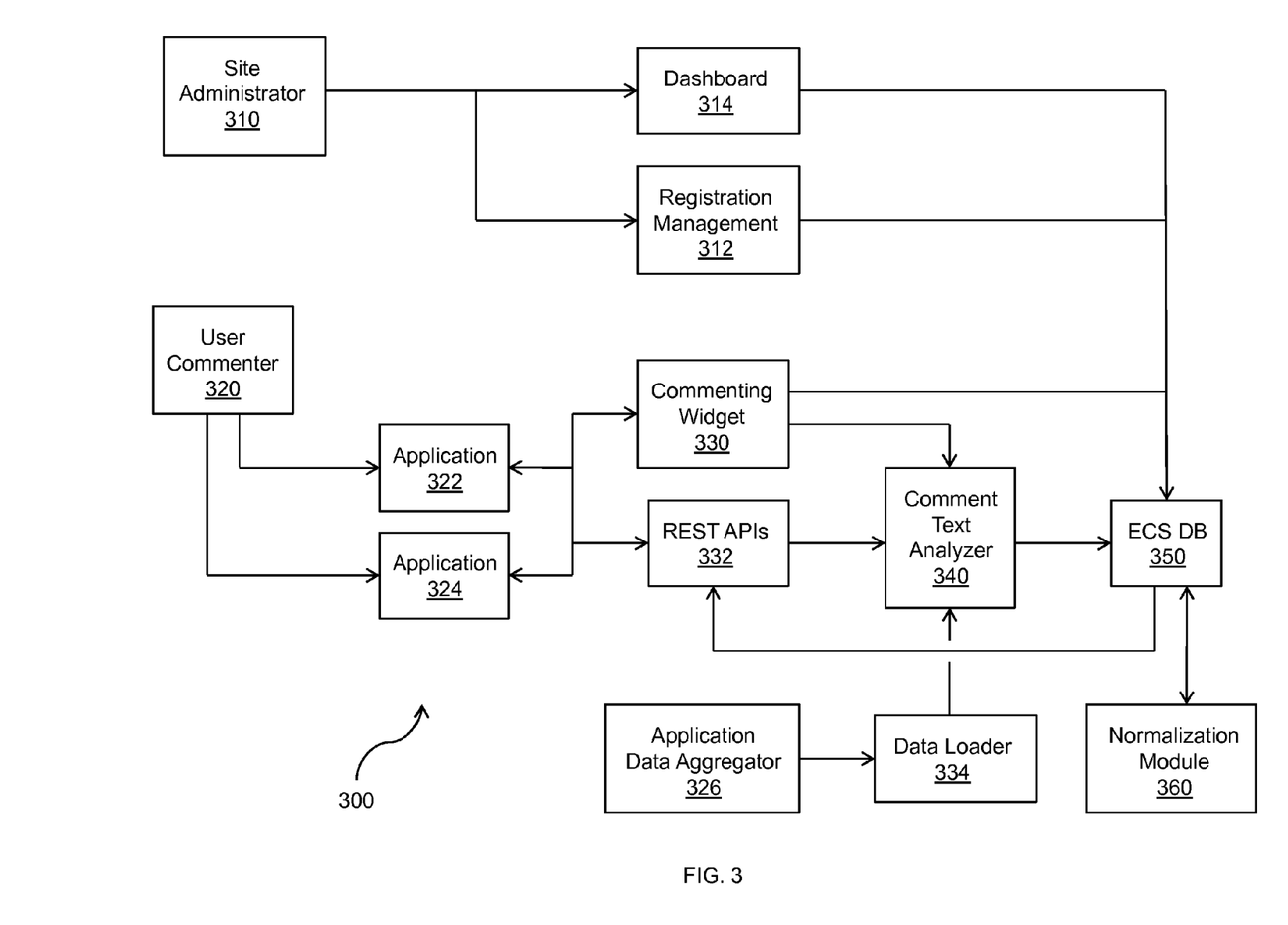
FIG. 3 illustrates an enterprise commenting service (ECS) system according to an embodiment of the invention.

FIG. 3 illustrates an enterprise commenting service (ECS) system 300 according to an embodiment of the invention, wherein a web site administrator or owner 310 manages a third party web site, web application, or social web space. Users/commenters 320 are consumers of the third party web site, web application, or social web space. The web site administrator 310 engages with a registration management module 312 to register their web site with the ECS system 300. When they do so, they specify access control settings for the data that the ECS system 300 will collect for their web site. Specifically, the web site administrator 310 sets read and write access to the data. Based on this information, the ECS system 300 surfaces the web site data accordingly.

The registration process provides the web site administrator 310 with a site ID (also referred to herein as an "identifier") by which data collected from the web site administrator 310's web site is segmented from data collected from other third party web sites. When the users 320 comment on pages on the third party web site, the information collected by the ECS system 300 is associated with the site ID. This allows for the scoping of data reads and data writes via the ECS system 300 to the site ID of a third party web site. In this way, the ECS system 300 associates comment data for any and all web sites with the source web site (via its site ID). This powers access control and other federated services provided by an ECS-provided commenting widget 330, a dashboard 314 (i.e., search interface), and a representational state transfer application program interface (REST API) 332.

The web site administrator 310 enables the users 320 to comment on web pages on their web site in a variety of ways. Specifically, the web site administrator 310 embeds the commenting widget 330 on their application 322 or creates its own commenting interface in their application 324 that interacts with the REST API 332. When the users 320 view the third party web site's web pages, they interact with the provided mechanisms to comment on the web pages. The act of commenting implicitly associates the comment(s) entered by the users 320 with the current page's URL, the identity of the user doing the commenting, and/or the site ID issued by the registration management module 312.

In at least one embodiment, the third party web site has a full-service commenting component already part of their application 326. That is, the web site has its own commenting interface (to enable the users 320 to comment on web pages that are part of the web site) and commenting database (to store the comment-related data locally to the application). A data loader 334 provides the ability to load data from the application 326 such that the commenting data collected by the third party web site is aggregated in a central place in the ECS system 300. In at least one embodiment, the third party web site makes its commenting data available over hypertext transfer protocol (HTTP) in any well-formed extensible markup language (XML) format. When registering the web site via the registration management module 312, the site administrator 310 provides a URL and other information to allow the data loader 334 to load data from their web site into a central electronic database 350 (also referred to herein as the "repository"). The loaded data is associated with the site ID issued by the registration management module 312.

The commenting data in the database 350—added either via the commenting widget 330, the REST API 332, or the data loader 334—undergoes processing. In at least one embodiment of the invention, the processing occurs before the commenting data is added to the database 350. The raw comments entered by the users 320 are stored in the database in their raw form, but are also analyzed via a comment text analyzer 340 to extract keywords from the raw comments and/or to perform other kinds of analysis, including but not limited to sentiment analysis, etc.

A normalization module 360 ensures that variations of keywords are associated with one another so that, for example, comments containing the keywords "CAT," "cat," "caat," and "cats" are associated with one another. The dashboard 314, normalization module 360, and ECS comment-based search in general, first normalizes the search terms and performs the search using the normalized terms. This ensures that any URLs whose comments contain keywords matching any variants of the search terms are located and returned as results.

ECS normalization is an asynchronous process that analyzes the keywords associated with the comment data in the database 350 to improve the keyword normalization results. It does so by learning from the keyword data present in the database 350. For example, if a page has a comment by a user containing the keyword "NeuralNets" (one of many commonly used syntaxes for commenting) the keyword may, initially, be normalized to "neuralnets". However, if another user enters a comment for a (potentially) different URL with "neural" in its text, for example, the next time the normalization process runs, it recognizes that "neural" is a word used by other commenters and re-normalizes "neuralnet" to "neural_net". This is an example of how the asynchronous normalization process can learn from the commenting data to improve its normalization of keywords.

The commenting widget 330, which is loaded on a particular web page, displays existing comments that the users 320 have made via the commenting widget 330. It also provides a mechanism by which a user 320 can enter a new comment. In at least one embodiment, the commenting widget 330 enables the users 320 to sort comments by date or hierarchy, report "inappropriate" comments, create multiple levels of comments (i.e., comments on comments), and/or edit or delete their existing comments. The commenting widget 330 is served by the ECS system 300 and the comments created via the commenting widget 330 are stored in the central electronic database 350.

In at least one embodiment of the invention, the users 320 consume the comment data via a related content widget. The related content widget 330, which is loaded on a particular page, surfaces URLs related to the current page, where "related" is determined by analysis of the commenting data associated with the page. For example, the keywords derived from a web page's comments (in their normalized form) are used to find and surface pages in the database 350 that have similar keywords. In at least one embodiment, the related content widget surfaces a "cloud" of keywords scoped to either a web site ID, multiple web site IDs, or all publically-readable web site IDs (as defined by the configured access control for each third party web site at registration time). In addition, the users 320 request a really simple syndication (RSS)-formatted feed of URLs commented by a particular user, or an Atom-formatted feed of comments associated with a particular URL, via a REST API.

In at least one embodiment of the invention, the methods by which commenting data is surfaced are subject to the access control levels configured for the site ID that the data is associated with. Because site IDs enable commenting data to be scoped to a particular web site or application, all reads can be scoped to one site ID, many site IDs, or all publically-readable (as defined by the configured access control for each third party web site at registration time) web site data in the database 350. As mentioned, part of the power of aggregating commenting data across multiple third party web sites is that useful analytics can be performed on a large and disparate corpus of data. The dashboard 314 surfaces aspects of these analyses, such as statistics related to usage and data connected by common metadata, such as URLs commented on by users that tend to use similar keywords (as derived from the raw comments). These analyses are potentially extremely powerful.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
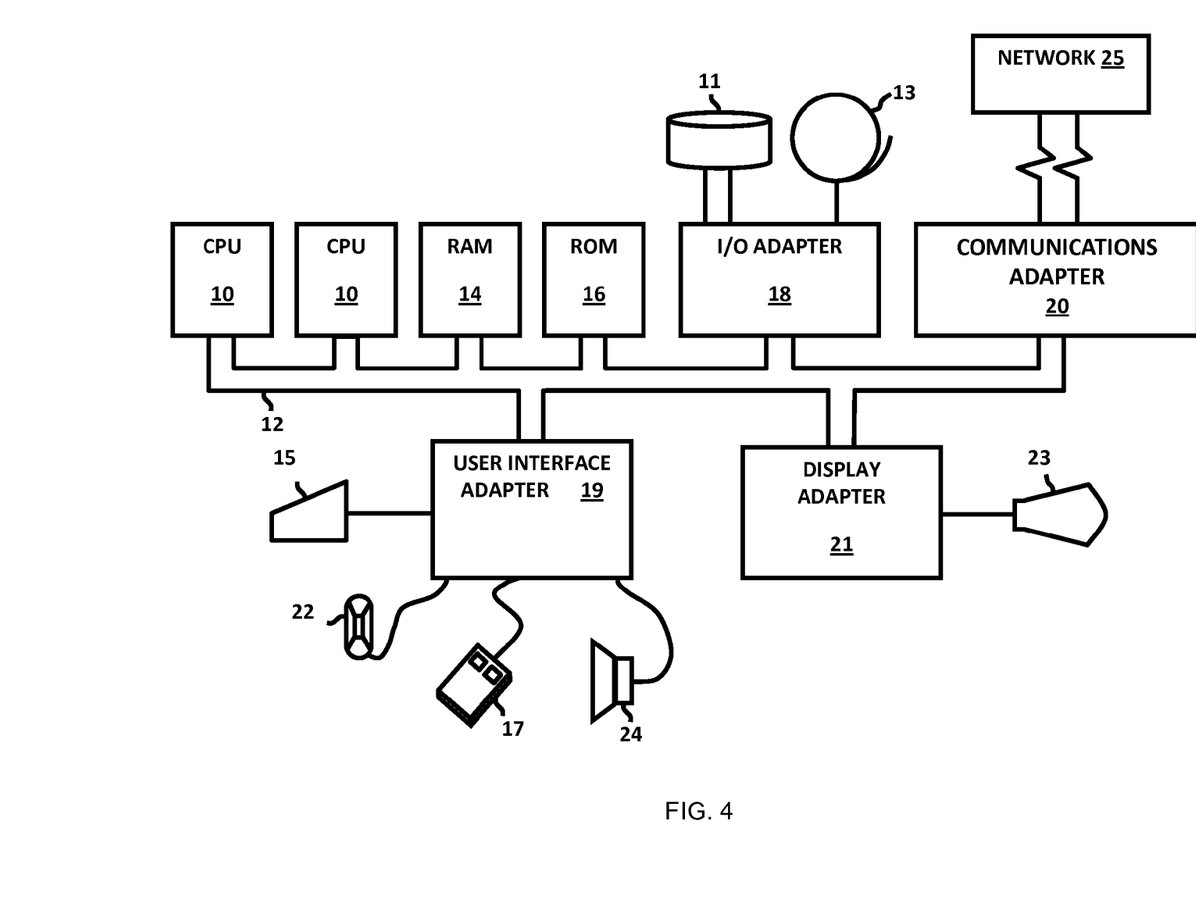
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, including:
   extracting from a plurality of web sites user-generated comment data on web pages of the web sites;
   obtaining access control parameters from the web sites;
   tagging the comment data with identifiers indicating the web sites that the comment data was extracted from;
   storing the comment data in a repository;
   extracting keywords from the comment data;
   normalizing the extracted keywords, said normalizing including
      creating a single normalized keyword for multiple extracted keywords related to the same topic, and
      tagging comment data that include at least one of the multiple extracted keywords with the normalized keyword; and
   controlling access to the repository based on the access control parameters, the access to the repository including at least one of read access and write access.

2. The method according to claim 1, further including:
   receiving a repository query, the repository query including the normalized keyword; and
   displaying results of the repository query, the results including at least one of comment data tagged with the normalized keyword, and identifiers tagged to the comment data tagged with the normalized keyword.

3. The method according to claim 1, further including:
   receiving a repository query, the repository query including an identifier; and displaying results of the repository query, the results including at least one of comment data tagged with the identifier, and normalized keywords tagged to the comment data tagged with the identifier.

4. The method according to claim 1, further including tagging the comment data with at least one of universal resource locators (URLs) indicating the web pages that the comment data are on, and authors of the comment data.

5. The method according to claim 4, further including:
receiving a repository query, the repository query including a URL; and
displaying results of the repository query, the results including at least one of comment data tagged with the URL, authors of the comment data tagged with the URL, an identifier tagged to the comment data tagged with the URL, normalized keywords tagged to the comment data tagged with the URL, and keywords extracted from the comment data tagged with the URL.

6. The method according to claim 4, further including:
receiving a repository query, the repository query including an author; and
displaying results of the repository query, the results including at least one of comment data tagged with the author, URLs tagged to the comment data tagged with the author, identifiers tagged to the comment data tagged with the author, normalized keywords tagged to the comment data tagged with the author, and keywords extracted from the comment data tagged with the author.

7. The method according to claim 4, further including:
receiving a repository query, the repository query including the normalized keyword; and
displaying results of the repository query, the results including at least one of comment data tagged with the normalized keyword, authors of the comment data tagged with the normalized keyword, URLs tagged to the comment data tagged with the normalized keyword, identifiers tagged to the comment data tagged with the normalized keyword, and keywords extracted from the comment data tagged with the normalized keyword.

8. The method according to claim 4, further including:
receiving a repository query, the repository query including an identifier; and
displaying results of the repository query, the results including at least one of comment data tagged with the identifier, authors of the comment data tagged with the identifier, URLs tagged to the comment data tagged with the identifier, normalized keywords tagged to the comment data tagged with the identifier, and keywords extracted from the comment data tagged with the identifier.

9. The method according to claim 1, further including replacing the normalized keyword with an updated normalized keyword based on at least one of:
comment data in the repository at the time the normalized keyword was created;
new comment data extracted from the web sites since the normalized keyword was created; and
search terms used to query the repository.

10. The method according to claim 1, further including uploading a widget onto the web pages for at least one of entering the comment data and viewing the comment data.

11. The method according to claim 1, wherein the access to the repository is via a graphical user interface, wherein at least one of the graphical user interface and the repository are separate from the web sites.

12. The method according to claim 1, wherein said extracting of the comment data includes extracting the comment data from at least one of:
a widget on a web page, wherein the widget is commonly used among all of the web pages; and
a user interface on the web page, wherein the user interface is not commonly used among all of the web pages.

13. A method, including:
extracting from a plurality of web sites user-generated comment data on web pages of the web sites;
obtaining access control parameters from the web sites;
tagging the comment data with:
identifiers indicating the web sites that the comment data was extracted from,
universal resource locators (URLs) indicating the web pages that the comment data are on, and
authors of the comment data;
storing the comment data in a repository;
extracting keywords from the comment data;
normalizing the keywords, said normalizing including
creating a single normalized keyword for multiple keywords related to the same topic, and
tagging comment data that include at least one of the multiple keywords with the normalized keyword, such that all comment data that include at least one of the multiple keywords is tagged with the same normalized keyword; and
controlling access to the repository based on the access control parameters, the access to the repository including at least one of read access and write access.

14. The method according to claim 13, further including:
receiving a repository query, the repository query including a URL; and
displaying results of the repository query, the results including at least one of comment data tagged with the URL, authors of the comment data tagged with the URL, an identifier tagged to the comment data tagged with the URL, normalized keywords tagged to the comment data tagged with the URL, and keywords extracted from the comment data tagged with the URL.

15. The method according to claim 13, further including:
receiving a repository query, the repository query including an author; and
displaying results of the repository query, the results including at least one of comment data tagged with the author, URLs tagged to the comment data tagged with the author, identifiers tagged to the comment data tagged with the author, normalized keywords tagged to the comment data tagged with the author, and keywords extracted from the comment data tagged with the author.

16. The method according to claim 13, further including:
receiving a repository query, the repository query including the normalized keyword; and
displaying results of the repository query, the results including at least one of comment data tagged with the normalized keyword, authors of the comment data tagged with the normalized keyword, URLs tagged to the comment data tagged with the normalized keyword, identifiers tagged to the comment data tagged with the normalized keyword, and keywords extracted from the comment data tagged with the normalized keyword.

17. The method according to claim 13, further including:
receiving a repository query, the repository query including an identifier; and
displaying results of the repository query, the results including at least one of comment data tagged with the identifier, authors of the comment data tagged with the identifier, URLs tagged to the comment data tagged with the identifier, normalized keywords tagged to the comment data tagged with the identifier, and keywords extracted from the comment data tagged with the identifier.

18. The method according to claim 13, further including replacing the normalized keyword with an updated normalized keyword based on at least one of:
comment data in the repository at the time the normalized keyword was created;
new comment data extracted from the web sites since the normalized keyword was created; and
search terms used to query the repository.

19. The method according to claim 13, further including uploading a widget onto the web pages for at least one of entering the comment data and viewing the comment data.

20. A system comprising:
an aggregation module for extracting from a plurality of web sites user-generated comment data on web pages of the web sites;
a registration module for obtaining access control parameters from the web sites;
a central processing unit (CPU) for tagging the comment data with:
identifiers indicating the web sites that the comment data was extracted from,
universal resource locators (URLs) indicating the web pages that the comment data are on, and
authors of the comment data;
a repository for storing the comment data;
a text analyzer for extracting keywords from the comment data and normalizing the keywords to create a single normalized keyword for multiple keywords related to the same topic, the CPU tags comment data that include at least one of the multiple keywords with the normalized keyword such that all comment data that include at least one of the multiple keywords is tagged with the same normalized keyword; and
an access controller for controlling at least one of read access and write access to said repository based on the access control parameters.

21. The system according to claim 20, further including a search engine for:
receiving a repository query, the repository query including a URL; and
sending results of the repository query, the results including at least one of comment data tagged with the URL, authors of the comment data tagged with the URL, an identifier tagged to the comment data tagged with the URL, normalized keywords tagged to the comment data tagged with the URL, and keywords extracted from the comment data tagged with the URL.

22. The system according to claim 20, further including a search engine for:
receiving a repository query, the repository query including an author; and
sending results of the repository query, the results including at least one of comment data tagged with the author, URLs tagged to the comment data tagged with the author, identifiers tagged to the comment data tagged with the author, normalized keywords tagged to the comment data tagged with the author, and keywords extracted from the comment data tagged with the author.

23. The system according to claim 20, further including a search engine for:
receiving a repository query, the repository query including the normalized keyword; and
sending results of the repository query, the results including at least one of comment data tagged with the normalized keyword, authors of the comment data tagged with the normalized keyword, URLs tagged to the comment data tagged with the normalized keyword, identifiers tagged to the comment data tagged with the normalized keyword, and keywords extracted from the comment data tagged with the normalized keyword.

24. The system according to claim 20, further including a search engine for:
receiving a repository query, the repository query including an identifier; and
sending results of the repository query, the results including at least one of comment data tagged with the identifier, authors of the comment data tagged with the identifier, URLs tagged to the comment data tagged with the identifier, normalized keywords tagged to the comment data tagged with the identifier, and keywords extracted from the comment data tagged with the identifier.

25. A computer program product, including:
a non-transitory computer readable storage medium;
first program instructions to extract from a plurality of web sites user-generated comment data on web pages of the web sites;
second program instructions to obtain access control parameters from the web sites;
third program instructions to tag the comment data with:
identifiers indicating the web sites that the comment data was extracted from,
universal resource locators (URLs) indicating the web pages that the comment data are on, and
authors of the comment data;
fourth program instructions to store the comment data in a repository;
fifth program instructions to extract keywords from the comment data;
sixth program instructions to normalize the keywords, said sixth program instructions
create a single normalized keyword for multiple keywords related to the same topic, and
tag comment data that include at least one of the multiple keywords with the normalized keyword, such that all comment data that include at least one of the multiple keywords is tagged with the same normalized keyword; and
seventh program instructions to control access to the repository based on the access control parameters, the access to the repository including at least one of read access and write access,
said first program instructions, said second program instructions, said third program instructions, said fourth program instructions, said fifth program instructions, said sixth program instructions, and said seventh program instructions are stored on said computer readable storage medium.

* * * * *